Aug. 1, 1944.  C. R. STONE  2,355,017
VALVE
Filed June 11, 1942
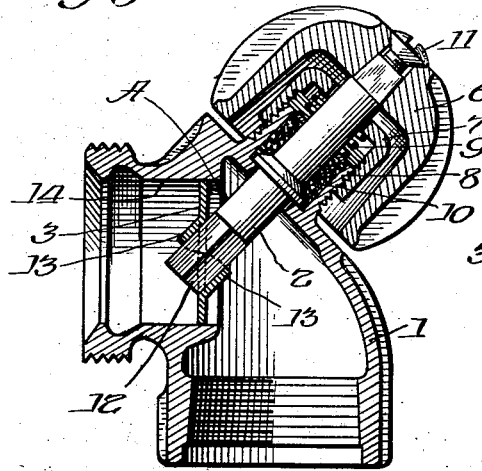
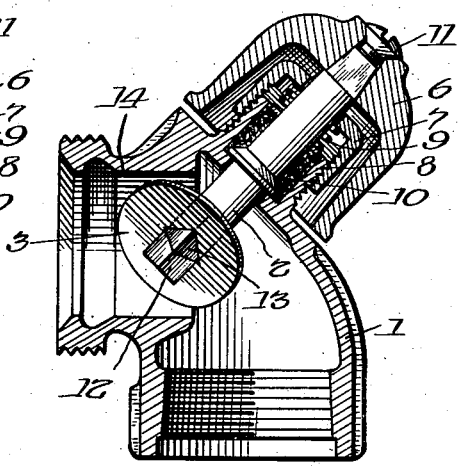
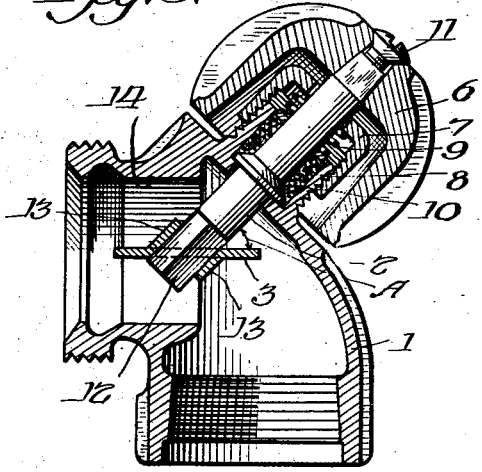
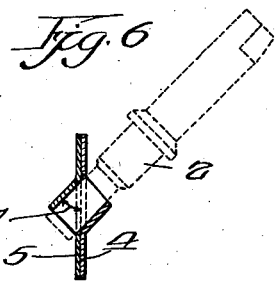
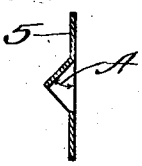
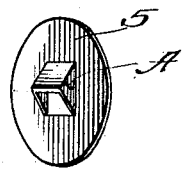
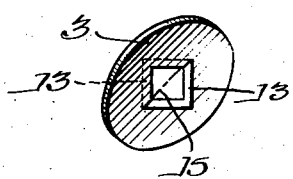
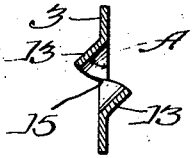
Inventor:
Carl R. Stone:
By Joseph O. Lange
Atty.

Patented Aug. 1, 1944

2,355,017

UNITED STATES PATENT OFFICE 2,355,017

VALVE

Carl R. Stone, Chicago, Ill., assignor to Crane Co., Chicago, Ill., a corporation of Illinois Application June 11, 1942, Serial No. 446,648

5 Claims. (Cl. 251—96)

This invention relates to valves and more particularly to a novel radiator valve used in hot-water heating systems, one object being to provide an improved hot-water radiator valve which is compact, simple in construction, efficiently performing and relatively easy to operate.

Another object of this invention lies in the provision of a hot-water radiator valve in which the opening and closing movements of the disc exert a desirable wiping action within the interior of the valve casing thus removing any adhering foreign matter ordinarily tending to cause sticking.

A further object of the invention is to provide an improved mounting of a butterfly valve on its stem thus facilitating the assembly of the parts and substantially reducing the cost of manufacture of valves of this type.

The foregoing and such other objects and advantages as may appear or be pointed out as this description proceeds, are obtained in the structural embodiments illustrated in the accompanying drawing in which similar parts are designated by the same reference characters in the several views, and in which Fig. 1 is a vertical sectional assembly view of a valve embodying the invention in the closed position.

Fig. 2 is a vertical sectional assembly view of a valve embodying the invention in the partly open or throttled position.

Fig. 3 is a vertical sectional assembly view of a valve embodying the invention in the full or wide open position.

Fig. 4 is a plan perspective view of the novel valve disc while positioned at a 45-degree angle.

Fig. 5 is a vertical sectional view of the novel valve disc shown in Fig. 4.

Fig. 6 is a vertical sectional view of a two-piece sheet metal valve disc representing a modified embodiment of the invention and shown in assembly with the valve stem (indicated by dotted lines).

Fig. 7 is a vertical sectional view of one of the identical halves of the novel modified two-piece valve disc shown in Fig. 6.

Fig. 8 is a plan perspective view of the valve disc face shown in Fig. 7.

Referring now to the drawing and particularly to Fig. 1, within the angular valve casing generally designated 1 the non-rising valve stem 2 is journally mounted and assembled in non-rotatable relation with the circular sheet metal valve disc 3. The valve disc is shown in the closed position in this figure, and in the partly open and full open positions respectively in Figs. 2 and 3. It will be seen that when in the partly open position the valve disc 3 maintains an oblique position with respect to the line flow, and when in the full open position the disc is horizontally positioned, i. e. at a right angle to its position when closed. It will thus be further apparent that a 90-degree rotation of the stem 2 brings the disc to the half open or oblique position while a 180-degree rotation of the stem brings the disc to the full open or horizontal position of Fig. 3.

Figs. 4 and 5 illustrate a preferred manner in which the sheet metal valve disc or the like may be constructed. First, the disc may be slit across the diagonal (line 15, Fig. 4) of the predetermined square or other polygonally shaped opening to be formed. A square aperture is then punched in the center of the disc 3, the size thereof depending upon the cross-sectional dimensions of the end-engaging portion of the stem 2. The aperture may be punched by two operations, one in one direction and the other in the opposite direction so that the bent portions form an aperture angle designated as "A" in Fig. 5, with relation to the face of the disc. Obviously the disc may also be made in a cast metal, composition or otherwise suitably formed without departing from the inventive concept.

Referring again to Fig. 1, it is seen that the stem 2 in its assembly with the valve has its square or other polygonally shaped end portion 12 inserted into the punched aperture of the disc 3 and is guided therewithin by the angularly formed or bent portions 13 of the apertured disc. Thus similarly the stem 2 assumes a position forming the angle A with the vertical and horizontal line flow through the valve. It has been found advantageous, for reasons to be discussed later, to make angle A preferably equal to 45 degrees, but this may vary depending upon the type of valve with which the stem and disc are assembled.

From the detail construction of the disc shown in Figs. 4 and 5, and from the assembly of the disc 3 with the stem 2 as shown in Fig. 1, it will be apparent that no fastening is required to hold the stem and disc in assembled relation, and as a consequence, an economical and simple construction is made possible. Because the periphery of the disc 3 fits snugly the bore 14 within which it lies makes it unnecessary to use any fixed attaching means between the stem and disc and this is true particularly realizing that the stem is relatively immovable axially. Absolute tightness in a valve of this type on hot water service is not essential or desirable; hence the fact that there is slight leakage past the disc in the closed position is not significant.

Referring again to Fig. 1, the upper portion of the stem 2 which extends exteriorly of the casing 1 is connected in the usual manner by a suitable means with the valve handle 6, as for example, by means of the screw 11. A conventional packing nut 7, threaded to the extension 8 of the casing 1 may be used to compress the spring 9 which, in turn, exerts pressure on the packing 10 in order to prevent leakage therepast. The above described concealed spring-loaded stuffing box is well known in the art pertaining to radiator valves.

Figs. 6, 7 and 8 illustrate another embodiment of the invention, but which also utilizes the benefits to be derived from use of the circular disc with its center formed so that the sides of the punched aperture preferably make an angle of 45 degrees with the line flow. Thus it is possible for the disc and stem to be assembled without any fastening means. In the embodiment of the invention illustrated in Figs. 6, 7 and 8, a two-part disc is shown, consisting of similar faces 4 and 5 in juxtaposition forming the angle A (preferably 45 degrees) with the flat portion of the circular sheet metal faces. In Fig. 6 the double faced disc is shown in assembly with the stem 2 (represented in dotted lines). The assembly is made by inserting the stem 2 into the square aperture so that the flat sides of the stem coincide with the bent sides of the punched aperture, and the stem 2 thus makes an angle of 45 degrees with the line of flow through the valve. The respective disc faces may be joined by brazing, welding, soldering or otherwise mechanically attached.

I am aware that radiator valves of this general type known as butterfly valves have been previously constructed in which the disc has been placed obliquely within the valve casing, and furthermore, I am aware that in previous constructions, the stem and disc have been held in assembled relationship without a positive fastening means. However, to my knowledge, no one has heretofore discovered nor utilized the advantages to be derived from using a circular disc with a polygonal aperture for receiving the stem preferably at an angle of 45 degrees with the benefits above set forth.

The advantages to be derived from my improved construction are twofold: (a) reduced manufacturing costs, and (b) mechanical. With regard to manufacturing costs, it is apparent that no stem threads other than wheel screw threads are used, and these may be dispensed with if desired; that the simple construction of the disc permits stamping from sheet metal or the like, since no specially finished or beveled edges are required. Regarding the mechanical advantages of locating the operating means of the valve at an angle of 45 degrees from the line of vertical or horizontal flow: (1) this arrangement allows additional clearance between the radiator and the hand of the operator when engaging the handle, and prevents the hand from coming in contact with the radiator and causing burning or bruising; (2) a more natural hand grip is provided by the 45-degree angle of my valve stem and operating handle; (3) there is less likelihood of a person stepping on the valve handle with the foot, since the 45-degree angle does not offer a rigid footing. The usual practice of standing on the valve handle in order to reach an object above the radiator is a dangerous one both to the person and to the radiator valve and its connections.

While the embodiments described and illustrated apply to angle valves, it should be pointed out that valves constructed in accordance with the present invention may also be adapted to a straight-through or globe pattern with union end. Therefore, I desire to be limited only by the scope of the appended claims.

I claim:

1. In a radiator valve having a casing with a substantially circular passage therethrough, a diagonally extending valve stem having end portions which are square in cross-section, a circular sheet metal disc having a central square aperture punched therefrom, the formed sides of said aperture having an approximate angle of 45 degrees with the face of the said disc, a square portion of said valve stem being held non-rotatably with the sides of said square punched aperture, whereby the circular disc is rotatable by the stem and guided by means of peripheral contact of at least two diametrically opposed points of the said circular disc within the walls of the circular casing passage during the course of revolving from vertical to horizontal planes and vice versa.

2. In a radiator valve having a casing with a passage therethrough, a valve stem having a square cross-section, a circular disc with opposed halves in juxtaposition and having complementary central square punched apertures, the sides of each of said apertures forming an angle of 45 degrees with the faces of said valve disc, the said valve stem extending through the disc apertures and being inclined at an angle of substantially 45 degrees with the said disc, the said stem being slidably movable relative to the inclined sides of said square punched apertures, whereby the disc revolves from a vertical to a horizontal plane upon rotation of the said stem.

3. A radiator valve comprising, in combination, a casing having a circular passage therethrough, a valve stem, a circular flat plate disc transversely movable in and snugly fitted within the circular passage, the said valve stem engaging the said disc and being substantially immovable longitudinally and forming an angle of approximately 45 degrees with the face of the said disc whereby rotation of the stem causes the disc to revolve from a vertical to a horizontal plane in said circular passage.

4. In a radiator valve having a casing with a substantially circular passage therethrough, a valve stem having portions which are polygonal in cross-section, a substantially circular disc having a central polygonal aperture whereby portions of the aperture define acute angles with the opposite faces of the said disc, a polygonal portion of said valve stem being held non-rotatable with the sides of said disc aperture whereby the said disc is rotatable by the stem, the latter being diagonally positioned relative to the said disc and extending therethrough, the said disc being guided by means of a rotating tangential contact within the circular passage of the casing, whereby when the valve is in fully open position the said tangential contact is made substantially at two points diametrically opposite defining a line therebetween at right angles to the axis of the said stem.

5. A radiator valve or the like comprising a casing having a substantially circular passage therethrough, a valve stem having a polygonal cross-section at its lower end, a circular flat plate disc having a polygonal shaped aperture the sides of which extend at an acute angle to the face of said disc, the said disc being revolvable with said stem from a horizontal to a vertical plane within said circular passage, the said valve stem having its polygonal end portion engaging the polygonal aperture in the said disc whereby upon rotation of the said stem the disc is caused to revolve and have a rotating peripheral portion thereof in contact with the circular passage walls.

CARL R. STONE.